United States Patent
Sidey

Patent Number: 6,031,350
Date of Patent: Feb. 29, 2000

[54] POSITION CONTROL AND MONITORING CIRCUIT AND METHOD FOR AN ELECTRIC MOTOR

[76] Inventor: Roger Charles Hey Sidey, 39B Cambridge Park, London, United Kingdom, TW1 2JU

[21] Appl. No.: 09/029,979

[22] PCT Filed: Sep. 23, 1996

[86] PCT No.: PCT/GB96/02356

§ 371 Date: Mar. 17, 1998

§ 102(e) Date: Mar. 17, 1998

[87] PCT Pub. No.: WO97/12305

PCT Pub. Date: Apr. 3, 1997

[30] Foreign Application Priority Data

Sep. 26, 1995 [GB] United Kingdom ............ 9519620

[51] Int. Cl.$^7$ .................................................. G05B 11/28
[52] U.S. Cl. ...................... 318/599; 318/656; 318/810; 388/801; 388/812
[58] Field of Search .................. 318/653, 599, 318/656–660, 696, 685, 254, 439, 138, 807–811; 388/804, 801, 805, 811–814, 819, 820

[56] References Cited

FOREIGN PATENT DOCUMENTS

| 0 295 710 | 12/1988 | European Pat. Off. |
| 0 457 389 | 11/1991 | European Pat. Off. |
| 0 515 974 | 12/1992 | European Pat. Off. |
| 0 602 977 | 6/1994 | European Pat. Off. |
| 1-381 125 | 1/1975 | United Kingdom . |
| 2 088 589 | 6/1982 | United Kingdom . |
| 2 134 731 | 8/1984 | United Kingdom . |
| 2 142 452 | 1/1985 | United Kingdom . |
| 95 08214 | 3/1995 | WIPO . |

*Primary Examiner*—Brian Sircus
*Attorney, Agent, or Firm*—Oliff & Berridge, plc

[57] ABSTRACT

A position control and monitoring circuitry is provided for an electric motor having a plurality of coils and a movable element. A drive circuit generates a square wave drive signal of variable mark/space ratio to drive the coils to position the movable element. A monitoring circuit modulates square wave transitions at a sub-harmnonic of the drive signal frequency and generates a monitoring signal for injection into the coils. A sensor senses the monitoring signal from the coils to determine the position of the movable element. A difference circuit drives the drive circuit with a difference between an input signal and an output signal of the sensor.

8 Claims, 6 Drawing Sheets

POSITION CONTROL AND MONITORING CIRCUIT AND METHOD FOR AN ELECTRIC MOTOR

The present invention relates to means for driving and controlling an electric motor. Particularly, but not exclusively the invention relates to means for driving and controlling a linear electromagnetic motor, which comprises an integral position measurement system providing information on the output movement produced and enabling servo position control. A motor of this type is described in a prior GB Patent Application 9517603.8.

The control electronics required by such motors must provide power drive to the device, in order for it to produce mechanical output power, and must simultaneously provide precision excitation signals for the integral position measurement system. In addition a means of extracting and signal conditioning the resultant position signal and for implementing the servo control loop is required. The performance. efficiency, and cost of manufacture of systems employing such actuators is critically dependent on the concept and design of the associated drive and control electronics.

FIG. 1 of the accompanying drawing shows a linear motor and integral position measurement system of the type to which this invention is particularly relevant, and FIGS. 2a, 2b and 2c show the equivalent circuit or electrical schematic representations of the motor. The figures show the motor to consist basically of two or four inductive circuit elements which are connected in a half bridge according to FIGS. 2a and 2b or full bridge configuration as in FIG. 2c. DC or quasi-static DC drive voltage is applied across the bridge in combination with a superimposed steady state AC excitation signal to provide energization for the position measurement function. The resultant position signal appears as a single ended output at the node of the half bridge circuit or as a differential output at the mid point of the full bridge configuration. Imbalance of the bridge is bought about by movement of the magnet and pole piece assembly—which creates differential incremental changes in the inductance of the windings. As described in GB Patent application 9517603.8, interconnection of the windings is arranged such that the forces produced on the magnet assembly by current flow in the coils contribute in unison, whilst the incremental changes in inductance are lumped according to their sign in the relevant arms of the half bridge or full bridge circuits.

The present invention sets out to provide a combined power drive, transducer excitation and signal conditioning system and position control loop, which performs simultaneously to maxirnise the overall electromechanical efficiency of the system and to realise the capabilities of the integral position measurement of the actuator.

According to the invention there is provided an electronic system, comprising a power amplifier with antiphase outputs for driving the actuator/transducer assembly, a pre-amplifier for receiving output signals from the actuator/transducer assembly, an input command signal, and an excitation and signal conditioning circuit which functions to combine the outputs of the pre-amplifier, the input command signal, and a periodic excitation signal to provide input signals to the power amplifier for driving the actuator/transducer assembly.

The excitation and signal conditioning circuit may comprises an error conditioning and converter stage, which provides input to the power amplifier and a transducer excitation function generator, which provides periodic signals for combination with the input signals to the power amplifier.

Preferably the excitation and signal conditioning circuit includes a stage which transforms the input command signal supplied to the system to a suitable form for feeding a summation circuit, which derives a position error signal; and that the pre-amplifier supplies the actuator/transducer output signal to a second input of the summation circuit. The power amplifier may be a switching power amplifier.

The input command signal may be converted to a proportional AC signal before being compared with a position feedback signal, alternatively the actuator/transducer output signal may be converted to a proportional DC signal and compared directly to the input command signal.

The input signals provided to the power amplifier are preferably in the form of a pulse-width modulated representation which may be modified by adding a digital advancing/retarding technique to achieve a synchronous perturbation component.

The error conditioning and conversion circuit may also comprise: a synchronous detector, for demodulating incoming position error information using a synchronous reference signal provided by the said transducer excitation function generator. a servo loop compensation stage, for receiving a signal from the synchronous detector and responding to the DC component thereof by providing the compensation necessary for the desired position control loop characteristic; a converter stage, for converting a compensated DC error signal received from the servo loop compensation stage to a PWM signal, having period T; and a digital modulator for applying advance and retard to the PWM signal received from the converter stage, to produce a modulation having a period 2T.

The power amplifier may also be a linear amplifier and substantially sinusoidal perturbation signals may be employed to energise the actuator transducer assembly.

Preferably the excitation and signal conditioning circuit includes a stage which converts the input command signal to balanced complementary DC reference signals which are proportional in amplitude to the input command signal and a first synchronous demodulator which receives respective signals from the amplifier and also receives a synchronous reference potential and produces DC outputs in proportion to the synchronous component of the AC energising signal in the respective amplifier outputs.

The excitation and signal conditioning circuit may also comprise first summing means for summing the respective outputs of the said first synchronous demodulators with the said balanced complementary DC reference signals to form error signals and compensators for performing control loop compensation on the respective error signals associated with the synchronous perturbation component of the power amplifier output.

In a first and second preferred embodiment of the invention, the transducer excitation function generator and power amplifier are implemented using switching techniques, this offering high efficiency and drive power, and the signal conditioning processes are hybrid—that is they employ mixed analogue and switching technology.

In two further embodiments of the invention, a linear power amplifier is employed and steady state sinusoidal or near sinusoidal transducer excitation is used. In these embodiments much of the signal processing is linear although certain hybrid techniques are utilised. These further embodiments offer the potential for greater precision of performance of the overall system, but lack the benefits of efficiency, compactness and relatively low cost of manufacture of the preferred embodiments.

The invention will be further described by way of these exemplary embodiments and with reference to the accompanying drawings in which:

FIG. 6a is a block schematic diagram showing the principal sub-systems of the error signal conditioning and converter stage of the embodiment of FIG. 3a;

Figure 1:
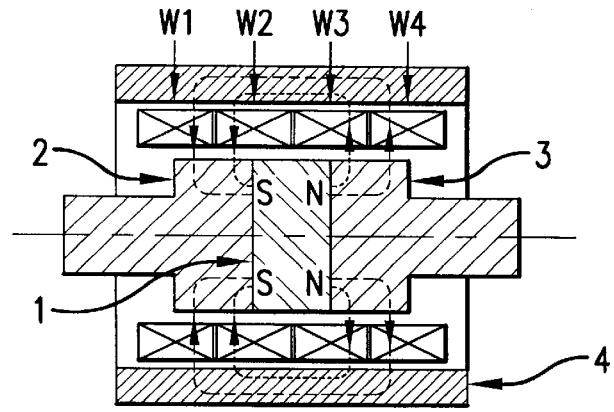
FIG. 1 is a cross sectional diagrammatic view of a combined linear electric motor and position measurement system with which the present invention can be used.
Figure 2A:
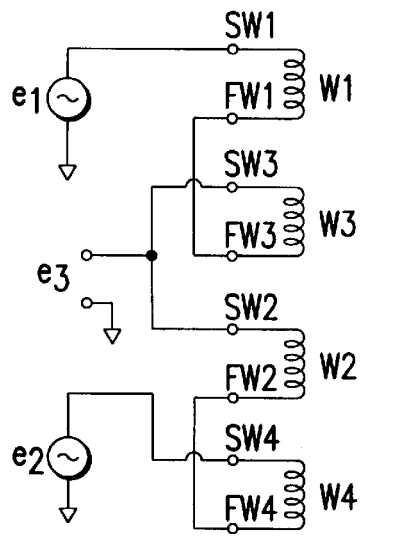
FIGS. 2a, 2b and 2c show electrical schematic circuits of the system of FIG. 1.
Figure 2B:
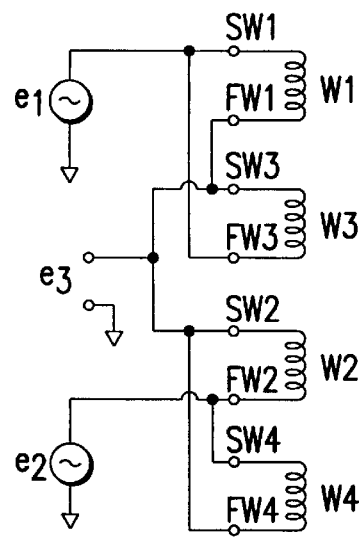
Figure 2C:
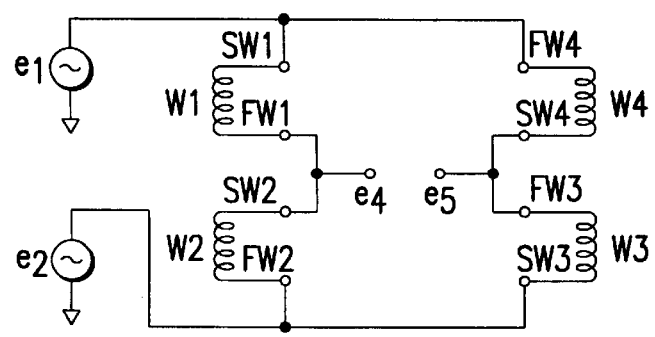
Figure 3:
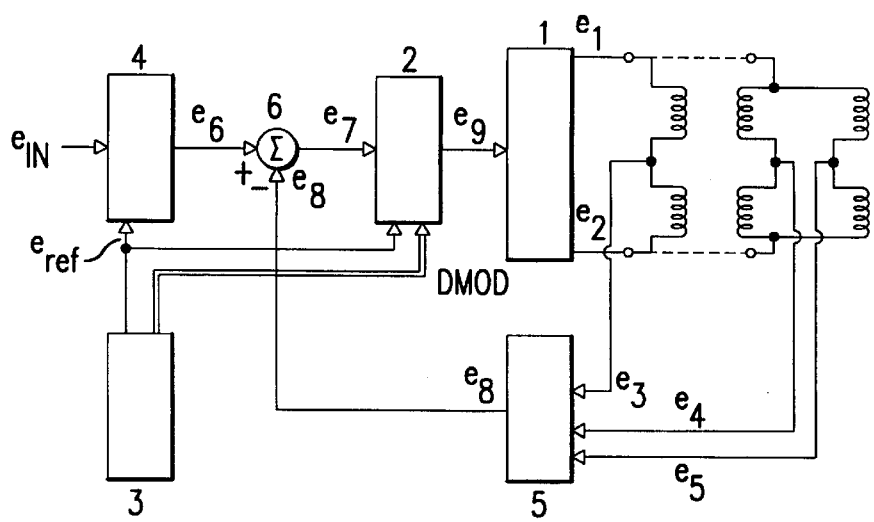
FIG. 3 is an overall block schematic diagram of the electronic system in accordance with the present invention arranged for achieving power drive. position measurement and position control of the motor of FIG. 1.

In the general system block diagram of FIG. 3 an actuator/sensor unit such as that depicted in FIG. 1 is shown being driven by a power amplifier 1. A single ended position signal $e_3$ and/or differential position signals $e_4$, $e_5$ derived from the actuator/sensor unit are fed to a pre amplifier 5 which includes a signal converter circuit. An input signal converter stage 4 produces a proportional version $e_6$ of the input command signal $e_{in}$, and the output of the pre-amplifier and signal converter stage 5, $e_8$, is subtracted from this. The difference, the position error signal $e_7$, is fed to a signal conditioning and conversion stage 2. In this stage the position error signal $e_7$ is demodulated if necessary, compensated. and converted to a signal suitable for feeding to the power amplifier 1. Compensated position error information and synchronous transducer energization are combined in the output of stage 2, the synchronous reference $e_{ref}$ and digital modulation signals DMOD required in the various embodiments of the invention for this purpose being provided by an excitation function generator stage 3.

Figure 3A:
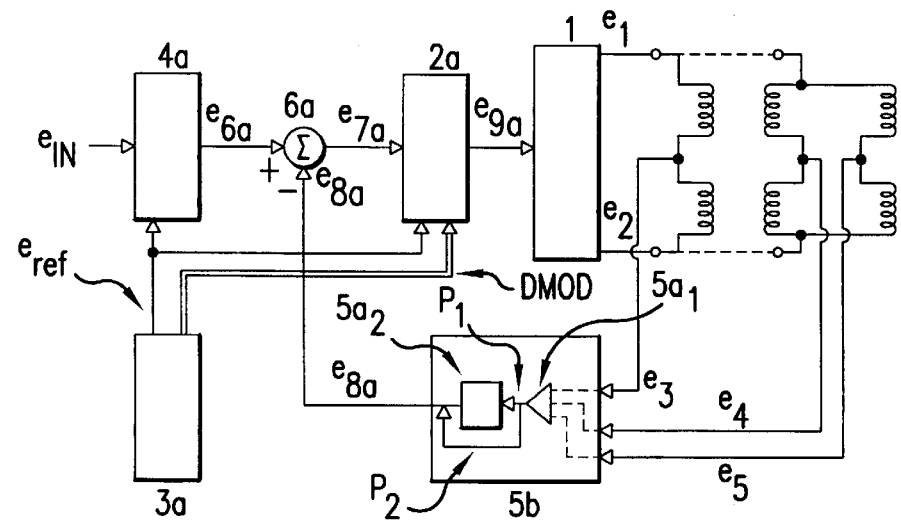
FIG. 3a is an overall block schematic diagram of a first preferred embodiment of the electronic system in accordance with the present invention employing a switching power amplifier and digitally derived transducer excitation signals.

FIG. 3a is a block schematic of a first preferred embodiment of the invention, in which an actuator/sensor unit such as that depicted in FIG. 1 is shown being driven by a switching power amplifier 1. Single ended position signals $e_3$ or differential position signals $e_4$, $e_5$ derived from the actuator/sensor unit are fed to the pre amplifier and signal converter stage $5_a$. In this first preferred embodiment of the invention, the output of stage $5_a$ is an AC signal, proportional to the position signal $e_3$ or to the differential position signals $e_4$, $e_5$. It may be a filtered version of these signals as shown by the path P1 comprising a pre amplifier $5_{a1}$ and filter $5_{a2}$, or it may simply be an amplified version of the signals $e_3$, or $e_4$, $e_5$ as shown by path P2 which features only the pre amplifier $5_{a1}$.

In order for the DC position command signal $e_{in}$ of FIG. 3a to be compared with the position feedback signal $e_{8a}$, it is converted to a synchronous AC signal $e_{6a}$. This is the function of the input signal converter stage $4_a$ which performs conversion of $e_{in}$ to a synchronous AC signal $e_{6a}$ using reference signal $e_{ref}$ provided by the excitation function generator $3_a$. In stage $4_a$, signal chopping or multiplying techniques are employed to produce an AC signal proportional in magnitude to the input $e_{in}$ and proportional in phase to the sign of $e_{in}$. The frequency of the resultant AC position command signal $e_{6a}$ is equal to that of the position feedback signal $e_{8a}$, and the phase. as determined by the synchronous reference $e_{ref}$ is arranged such that effective differencing of the AC position command signal $e_{6a}$ and the AC position feedback signal $e_{8a}$ can be performed by the summation stage $6_a$.

The resultant output $e_{7a}$ of the summation stage $6_a$ of FIG. 3a is thus a synchronous AC signal expressing in magnitude the degree of position error yielded by the control loop, and in phase, relative to the reference signal $e_{ref}$, the sign of the position error. As shown in FIG. 3a, the position error signal is then fed to the signal conditioning and converter stage $2_a$, the function of which is to demodulate the AC position error signal, to provide a position error signal suitably compensated for achieving closed loop stability in the position control system, to convert this signal to a pulse width modulated (PWM) representation suitable for driving the switching amplifier 1, and finally to modify this PWM representation such as to add a synchronous perturbation component which serves as energization for the position measurement function of the sensor/actuator unit of FIG. 1.

Figure 6A:
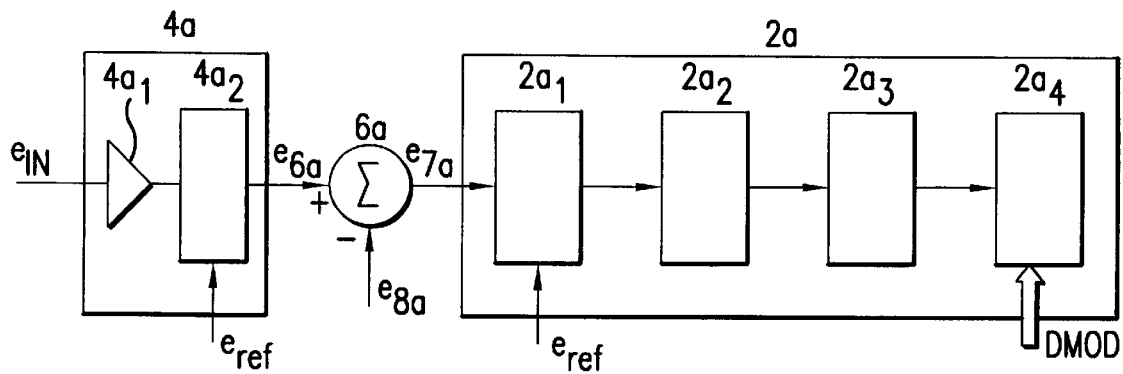

The block diagram of FIG. 6a shows the principal sub-systems of the signal conditioning and conversion stage $2_a$ and of the input signal convener stage $4_a$ appropriate to the first preferred embodiment of the invention. Incoming position error information $e_{7a}$ is demodulated by the synchronous detector $2_{a1}$ using the synchronous reference signal $e_{ref}$ provided by the transducer excitation function generator $3_a$ (see FIG. 3), and the resultant signal is fed to the servo loop compensation stage $2_{a2}$. This stage responds to the DC component of the demodulated signal providing the compensation necessary for the desired position control loop characteristic. Following this, the compensated DC error signal is converted to a pulse width modulated (PWM) signal of period T by converter stage $2_{a3}$. This signal in turn feeds digital modulator $2_{a4}$ which applies synchronous advance and retard to the T period PWM signal to produce a 2T period modulation. The necessary digital control signals for this digital modulation, DMOD, are provided by the excitation generator $3_a$. In this first preferred embodiment of the invention, the input position command signal $e_{in}$ is converted to a synchronous AC signal in order for it to be summed with the transducer position signal. This is shown in FIG. 6a where the input signal converter stage $4_a$ is seen to comprise an input buffer amplifier $4_{a1}$ which feeds a chopper or multiplier stage $4_{a2}$. The chopper stage uses reference signal $e_{ref}$ to multiply or to chop the input command signal $e_{in}$ to produce an AC signal $e_{6a}$ which is proportional in magnitude to $e_{in}$, but modulated by $e_{ref}$ such as to allow effective summation of $e_{6a}$ with the position feedback signal $e_{8a}$ at the synchronous frequency 1/2T.

Figure 3B:
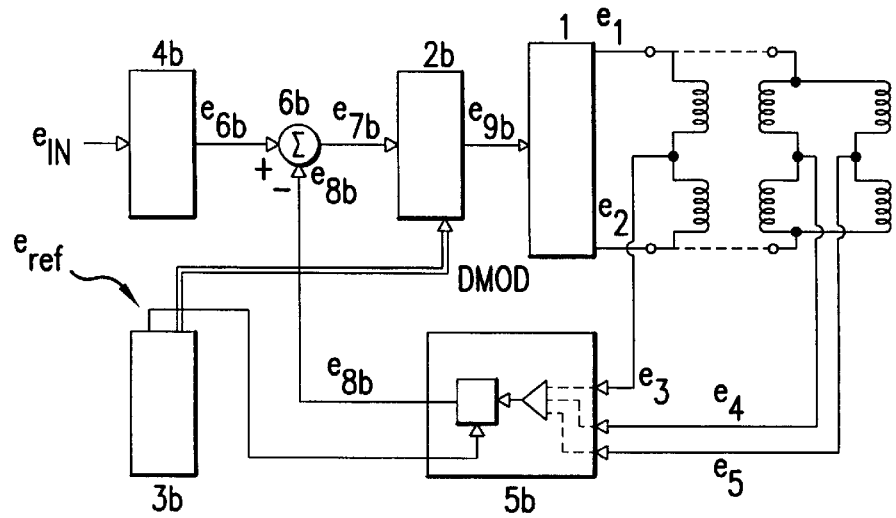
FIG. 3b is an overall block schematic diagram of a second preferred embodiment of the electronic system in accordance with the present invention employing a switching power amplifier and digitally derived transducer excitation signals.

FIG. 3b is a block schematic diagram of a second preferred embodiment of the invention, in which an actuator/sensor unit such as that depicted in FIG. 1 is shown being driven by a switching power amplifier 1. Single ended position signals $e_3$ or differential position signals $e_4$, $e_5$, derived from the actuator/sensor unit are fed to the pre amplifier and signal converter stage $5_b$. In this second preferred embodiment of the invention, the output $e_{8b}$ of stage $5_b$ is a DC signal proportional in magnitude to the position signal $e_3$ or to the differential position signals $e_4$, $e_5$, and in sign to the relative phase of the position feedback signals to the synchronous reference $e_{ref}$. In this configuration, the converted position feedback signal $e_{8b}$, being a DC proportional signal, is compared directly to the DC input command signal $e_{in}$, avoiding the need to convert the command signal $e_{in}$ to a synchronous AC signal. This further avoids the requirement to demodulate the error signal $e_{7b}$ produced by the summer stage $6_b$. Thus the input signal converter stage $4_b$ is simply a DC buffer amplifier which feeds a scaled version $e_{8b}$ of the DC input command signal $e_{in}$ to the summer stage $6_b$.

The resultant output $e_{7b}$ of the summer stage $6_b$ of FIG. 3b is thus a DC signal expressing directly in sign and magnitude the degree of position error yielded by the control loop. As shown in FIG. 3b, the position error signal is then fed to the signal conditioning and converter stage $2_b$, the function of which is to provide a position error signal suitably compensated for achieving closed loop stability in the position control system, to convert this signal to a pulse width modulated (PWM) representation suitable for driving the switching amplifier 1 and finally to modify this PWM representation such as to add a synchronous perturbation component which serves as energization for the position measurement function of the sensor/actuator unit of FIG. 1.

Figure 6B:
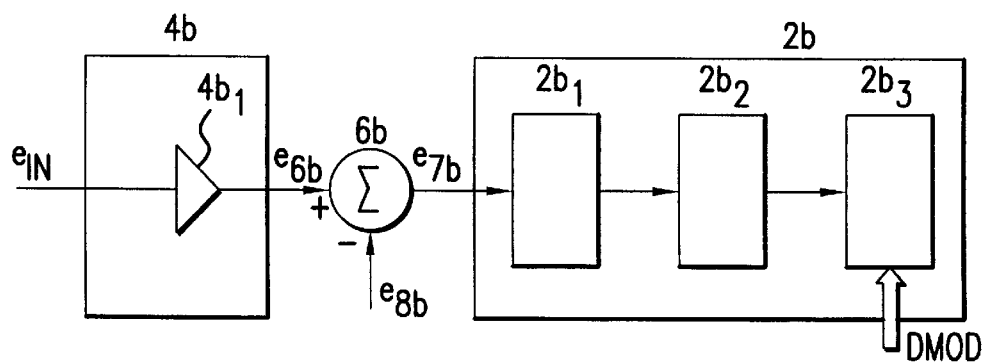
FIG. 6b is a block schematic diagram showing the principal sub-systems of the error signal conditioning and converter stage of the embodiment of FIG. 3b.

The block diagram of FIG. 6b shows the principal sub-systems of the signal conditioning and conversion stage $2_b$ and of the input signal converter stage $4_b$ appropriate to the second preferred embodiment of the invention. Incoming DC position error information $e_{7b}$ is fed to the servo loop compensation stage $2_{b1}$, this stage providing the compensation necessary for the desired position control loop characteristic. Following this, the compensated DC error signal is converted to a pulse width modulated (PWM) signal of period T by converter stage $2_{b2}$. This signal in turn feeds digital modulator $2_{b3}$, which applies synchronous advance and retard to the T period PWM signal to produce a 2T period modulation. The necessary digital control signals for this digital modulation, DMOD, are provided by the excitation generator $3_b$. In this second preferred embodiment of the invention, the input position command signal $e_{in}$ requires no conversion to a synchronous AC signal in order for it to be summed with the transducer position signal. Thus in FIG. 6b input signal converter stage $4_b$ is seen to comprise only a DC input buffer amplifier $4_{b1}$ which feeds the summer $6_b$.

Figure 5:
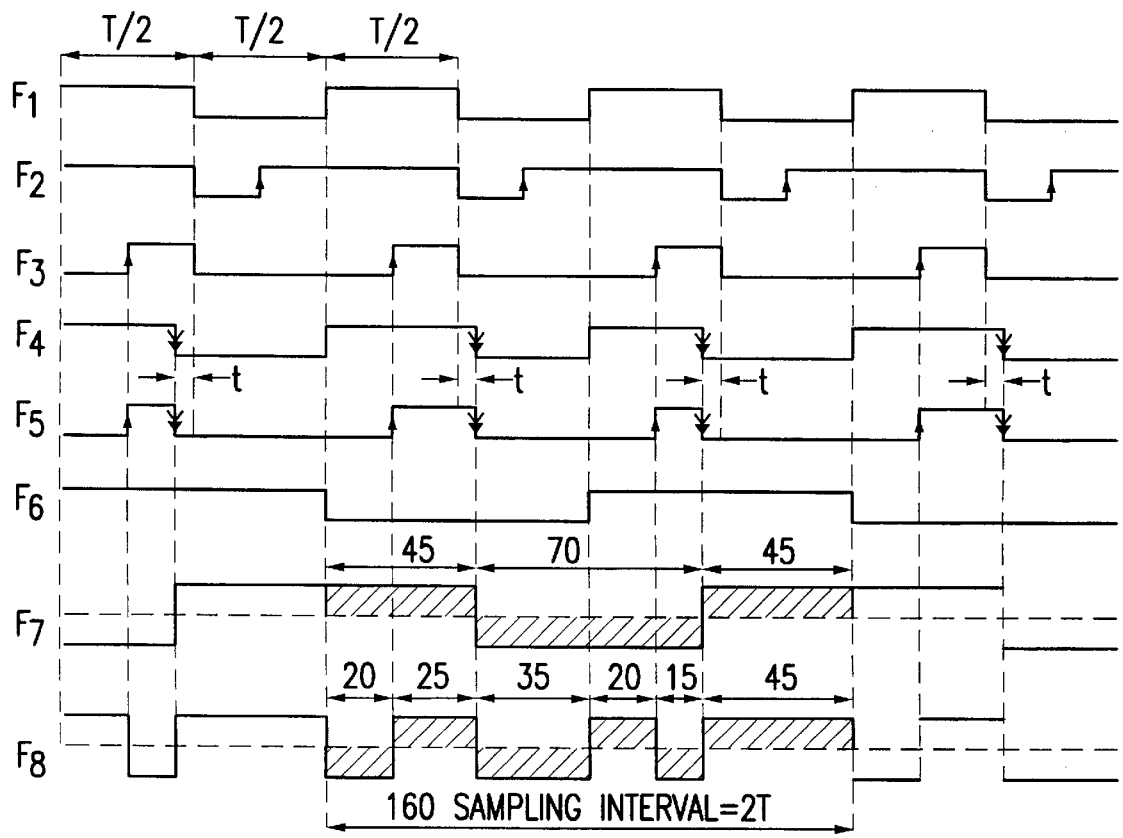
FIG. 5 is a timing diagram showing the means for achieving transducer excitation in the electronic systems of FIGS. 3a and 3b by the use of digital modulation of the power amplifier input signal.

FIG. 5 is a timing diagram, which shows the way in which the above preferred embodiments of the invention employ switch-mode techniques to provide simultaneous power drive and precision transducer excitation for a combined motor and position sensor device such as shown in FIG. 1.

Wave form $F_1$ in FIG. 5 shows an equal mark/space ratio square wave form such as might be applied to the input of the switching amplifier 1 of FIG. 3. The amplifier shown in diagrammatic form in FIG. 4 acts using power semiconductor devices F1, F2, F3 and F4 to switch the ends of the applied load, in a fashion closely following the switching input wave form $e_9$, between the applied power rails 0 V, +VE. This achieves minimal dissipation in the amplifier 1 and has the benefit that the amplitude of the amplifier output and the relative times of the switching transitions of the output are well defined and repeatable. The inductance of the load acts to smooth or average the current flowing and the magnitude of any resultant steady DC component is determined by the mean applied voltage divided by the net load circuit resistance. Thus for wave form $F_1$ of FIG. 5, having an equal mark/space ratio, the average DC load current is zero corresponding to a zero input to the amplifier.

Figure 4:
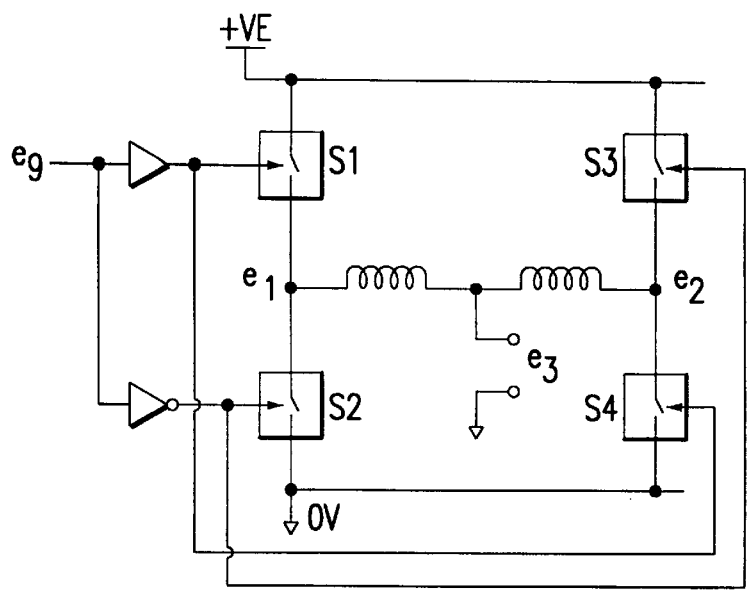
FIG. 4 is a schematic representation of a switching implementation of the power amplifier of FIGS. 3a and 3b, for providing power drive and transducer excitation for the system of FIG. 1.

Wave form $F_2$ of FIG. 5 shows pulse width modulation (PWM) of the amplifier input signal, this being achieved in the embodiment of FIG. 4 by time shifting the rising edge of the wave form, keeping the overall period to T seconds. The average DC value of the voltage applied to the load is now non zero and DC current flows in the load. Wave form $F_3$ shows PWM modulation, again using the rising edge of the wave form, but this time retarded to reverse the sign of the average current flowing in the load compared to that of wave form $F_2$. This follows already established principles, and it can be appreciated that PWM modulation can be achieved by modulating either transition of the wave form in a discrete (digital) or continuous (analogue) fashion. Either method would serve to provide DC or quasi static drive current to the motor system of FIG. 1 in proportion to the position error or command signal.

Wave form $F_4$ shows how digital techniques are employed to achieve synchronous PWM modulation of the amplifier drive wave form and hence well-controlled and synchronised AC excitation for the position measurement function. Here digital modulation techniques are used alternately to advance and retard a given transition of the PWM wave form by a fixed fraction of the PWM period T. This has the effect of alternately offsetting the mean drive voltage applied to the actuator by a constant fraction and at a constant frequency. The period of this applied perturbation is exactly twice that of the pulse width modulation associated with the quasi-static signal and the phase relative to a given rising or falling transition of the reference wave form $F_1$ is constant. These conditions are ideal for recovery of the transducer signal since the PWM modulation associated with DC or quasi static current is of period T whilst the excitation source for the position measurement, and hence the position information, is conveyed by the magnitude and relative phase of a signal of period 2T. Using synchronous demodulation techniques, the component due to the DC modulation at period T is automatically suppressed, allowing precision recovery of the position information despite the presence of the relatively large higher frequency PWM components.

This is illustrated by further reference to wave form $F_7$, which is the result of synchronously sampling wave form $F_4$ with the 2T period function wave form $_6$. Wave form $F_4$ carries no DC component, but is digitally modulated with a 2T period perturbation component. Synchronous sampling acts to multiply the wave form by a synchronous reference, in this case wave form $F_6$, which, given the correct relative phase relationship, acts to demodulate the synchronous component and yield a DC-proportional component in the resultant wave form. In the example of wave form $F_7$, the resultant has a net positive DC component of fraction ⅛ of the peak amplitude.

Wave form $F_8$ further shows how the detection method rejects the higher frequency PWM components carrying the DC or quasi-static signal to the system, Here wave form $F_5$, which carries both 2T period perturbation and T period PWM modulation, is synchronously sampled by wave form $F_6$, the resultant being wave form $F_8$. Although more complex, the average is the same as that of wave form $F_7$, this being contributed solely by the 2T period component of the wave form $F_5$.

Thus the perturbation or transducer excitation signals are applied using digital techniques to achieve precise, repeatable and highly synchronous position signals, and the DC or power drive signals are applied as additional pulse width modulation using either analogue or digital techniques.

It can be appreciated that suppression of the higher frequency T period PWM components, achieved by the use of synchronous demodulation, is effective for all perturbation functions with periods being a binary multiple of T.

Figure 7:
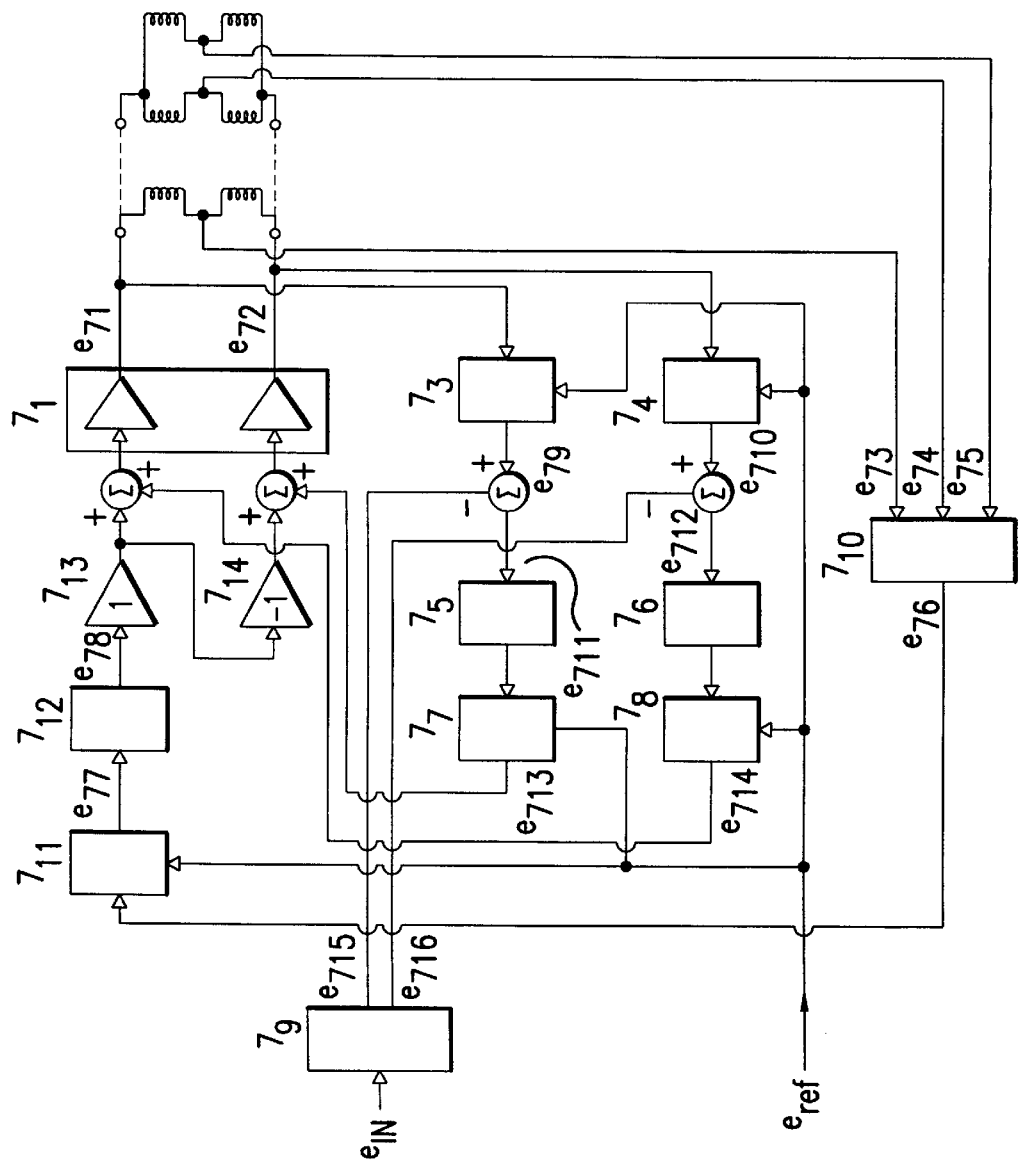
FIG. 7 is a block schematic diagram showing the principal sub-systems of a motor energization and position control system defining a third embodiment of the invention

FIG. 7 shows a second embodiment of the invention in which a complementary output linear power amplifier $7_1$ is employed to drive the actuator/sensor unit. The amplifier provides quasi static DC output voltage or current to provide power drive to the actuator/sensor unit, and superimposed sinusoidal or near sinusoidal functions for the AC energising signals.

In this embodiment the amplitudes of the AC energising voltages driving the actuator/sensor unit are independently controlled in local closed loop feedback systems. this operating the position sensing system of the actuator/sensor unit in a high precision null balance mode.

Referring to FIG. 7, the outputs $e_{71}$, $e_{72}$ of amplifier $7_1$ drive the actuator sensor unit which is configured either as a half bridge or full bridge circuit producing the corresponding single ended position output signal $e_{73}$ or the differential position output signals $e_{74}$, $e_{75}$. These position output signals are fed to a pre-amplifier stage $7_{10}$ which produces a single ended position output signal $e_{76}$.

The amplifier outputs $e_{71}$, $e_{72}$, in addition to driving the actuator sensor unit, are also fed to stages $7_3$ and $7_4$, these being synchronous demodulators which, in conjunction with the synchronous reference potential $e_{ref}$, produce DC output signals $e_{79}$, $e_{710}$ which are in exact proportion to the synchronous component of AC energising signal in the amplifier outputs $e_{71}$, $e_{72}$. These potentials are summed with reference signals $e_{715}$, $e_{716}$ which are derived from the position command signal $e_{in}$ by an input signal converter stage $7_9$. The stage $7_9$ acts to convert the command signal $e_{in}$ to balanced complementary DC outputs $e_{715}$, $e_{716}$ which are proportional in amplitude to $e_{in}$ but of opposite sign and superimposed on a constant component of voltage. Signals $e_{711}$, $e_{712}$ are the error signals or the deviations of potentials $e_{79}$ $e_{710}$ from the commanded values derived from $e_{in}$. These error signals are fed to stages $7_5$, $7_6$ which perform control loop compensation to achieve the desired response of amplitude control of the AC energising component of signals $e_{71}$, $e_{72}$ Following compensation, the outputs of stages $7_5$, $7_6$ are fed to voltage controlled function generators $7_7$, $7_8$ which produce sinusoidal or near sinusoidal output voltages $e_{713}$, $e_{714}$ which are synchronous with the switching reference $e_{ref}$ and proportional in amplitude to the outputs of the compensation stages $7_5$, $7_6$. The outputs of function generators $7_7$, $7_8$ are summed into the inputs of amplifier $7_1$ to complete the closed loops in which the AC energising components of the actuator sensor drive potentials $e_{71}$, $e_{72}$ are controlled.

The AC energization component of the actuator sensor potentials are thus anti phase sinusoidal or near sinusoidal functions which are controlled to vary in amplitude in a complementary fashion, in proportion to the magnitude and sign of the control system input command signal $e_{in}$. In order to provide for position sensing and control in mid range when $e_{in}$ is zero, an offset or constant magnitude component is added to the energising potentials. As mentioned above this component is introduced by an input converter stage $7_9$ in FIG. 7.

Returning to FIG. 7. It will now be evident that the signal $e_{76}$ appearing at the output of pre amplifier $7_{10}$ is a position error signal. The controlled amplitude AC energising potentials produced by the local control loops described above are summed by the inductive bridge circuit of the actuator unit and, given that the relative imbalance of the energising potentials corresponds to the relative imbalance of the actuator bridge inductances (brought about by movement of the actuator), then the position output signal $e_{73}$ or $e_{74}$, $e_{75}$ from the sensor/actuator is of null amplitude.

To implement closed loop position control of the actuator sensor unit the pre amplified null error signal $e_{76}$ is fed to a synchronous demodulator stage $7_{11}$. Using the synchronous reference $e_{ref}$ this stage produces a DC output $e_{77}$ which is proportional in magnitude and sign to the AC error signal $e_{76}$. This in turn feeds control loop compensation stage $7_{12}$ which acts on the error signal $e_{77}$ to provide the desired response characteristics for the overall servo position control function. The position control loop is completed by splitting the compensated position error signal $e_{78}$ into complementary outputs via amplifiers $7_{13}$, $7_{14}$ and summing these signals with the AC energising inputs $e_{713}$, $e_{714}$ into the power amplifier $7_1$.

The benefit of the null balance control loop described above is that for all output positions of the actuator unit according with the commanded position represented by signal $e_{in}$, the position output signals $e_{73}$ or $e_{74}$, $e_{75}$ produced by the actuator unit are null. This means that precision of signal processing in the position control loop is not required.

Figure 8:
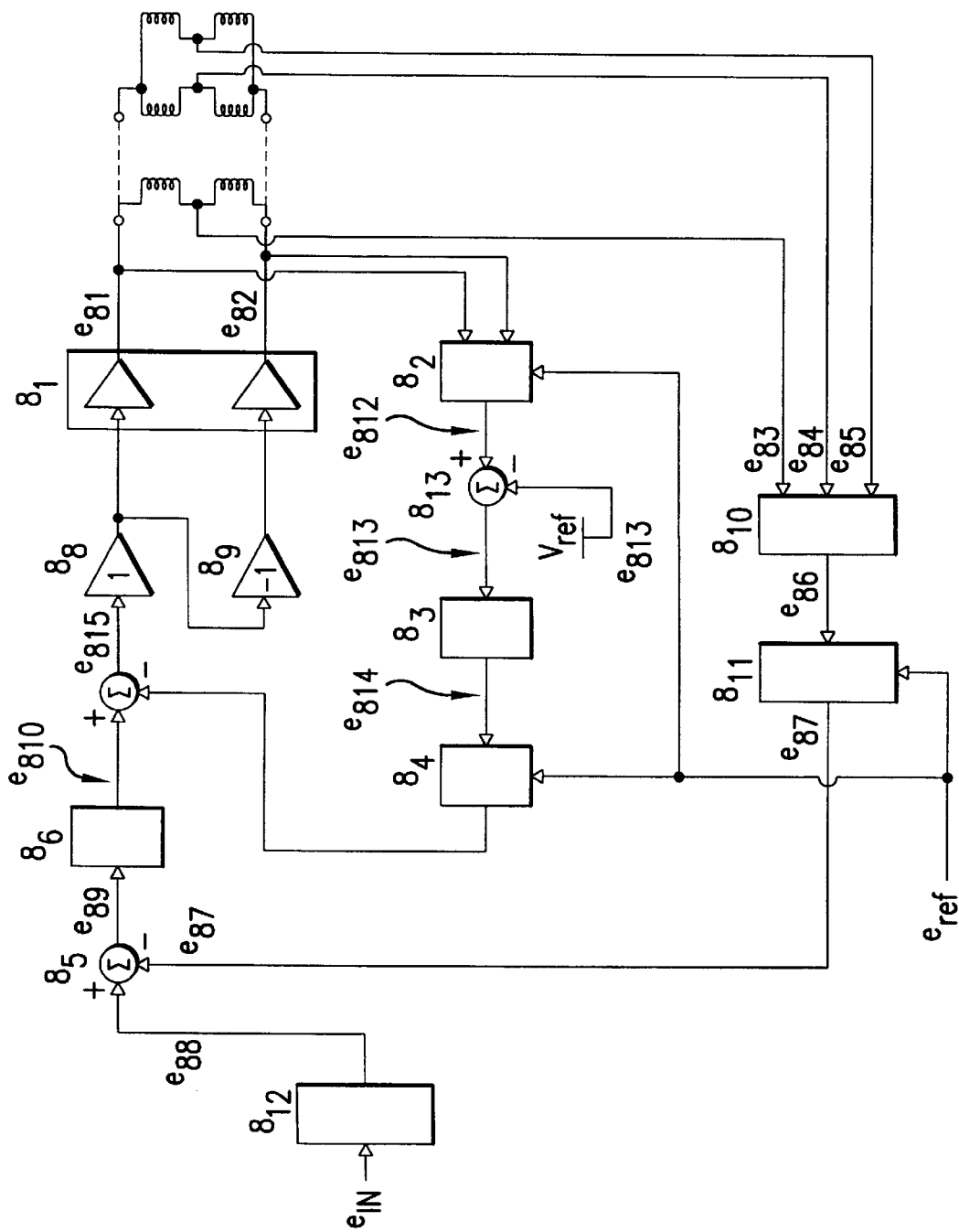
FIG. 8 is a block schematic diagram showing a motor energization and position control system defining an alternative functional arrangement of the embodiment of FIG. 7.

FIG. 8 shows a third embodiment of the invention which is a modification of the configuration depicted in FIG. 7. In this embodiment the AC energising voltages driving the actuator/sensor unit are maintained at constant amplitude with the result that the feedback signals from the sensor portion of the unit correspond to absolute position and not to position error as in the system of FIG. 7 described above. This arrangement has the benefit of reduced overall complexity and hence cost, but lacks the precision of operation attainable from the system of FIG. 7.

Referring to FIG. 8, the outputs of amplifier $8_1$ drive the actuator/sensor unit producing a single ended position output signal $e_{83}$ or differential position output signals $e_{84}$, $e_{85}$. These position signals are fed to a pre amplifier stage $8_{10}$ which in turn feeds a demodulator stage $8_{11}$. The demodulator stage, using the synchronous reference signal $e_{ref}$ converts the AC position feedback signal $e_{86}$ to a DC signal $e_{87}$, the magnitude of which is proportional to $e_{86}$, and the sign being determined by the phase of $e_{86}$ relative to that of the reference $e_{ref}$ To achieve position control, the demodulated position feedback signal $e_{87}$ is compared with a buffered version $e_{88}$ of input command signal $e_{in}$ by the summation stage $8_5$. The resultant position error signal $e_{89}$ is fed to the stage $8_6$ which provides the necessary compensation of the error signal for the required overall position control loop response. This compensated error signal $e_{810}$ then feeds the power amplifier via an additional summer and driver stages $8_7$, $8_8$ and $8_9$. The additional summer stage $8_7$ fınctions to allow injection of the transducer excitation unction $e_{811}$ into the power amplifier $8_1$. This is a periodic sinusoidal or near sinusoidal function produced by stage $8_4$. This function emerges from stage $8_7$ summed with, and hence superimposed upon the position error signal $e_{810}$. This composite signal $e_{815}$ is converted to balanced antiphase signals by the stages $8_8$, $8_9$ where it drives the inputs of the power amplifier $8_1$. The outputs of this amplifier $e_{81}$, $e_{82}$ thus contain balanced or differential drive components of both the power actuation and transducer energization signals required by the actuator/sensor unit. The function of the energization control loop described here is to stabilise the amplitudes of the transducer energization component of the actuator/sensor drive signals to a degree adequate for the required position accuracy and repeatability. To achieve this, the outputs $e_{81}$, $e_{82}$ of the amplifier $8_1$ are fed to stage $8_2$ which performs demodulation of the perturbation component of $e_{81}$, $e_{82}$ using the synchronous reference signal $e_{ref}$. The stage $8_2$ responds to the difference of signals $e_{81}$, $e_{82}$ thus ensuring that the overall amplitude of the energization applied to the actuator/sensor unit is taken into account. The output $e_{812}$ of stage $8_2$ is a DC signal proportional in magnitude to the synchronous component of the difference between $e_{81}$ and $e_{82}$ which is compared with a DC reference potential Vref in the summer stage $8_{13}$. The resultant error signal $e_{813}$ feeds stage $8_3$ which provides the compensation required to achieve the desired response characteristic of the excitation signal stabilisation loop. The compensated DC output, $e_{184}$ then feeds the function generator stage $8_4$. This stage, using the synchronous reference signal, $e_{ref}$, produces a sinusoidal output wave-form approximately proportional in amplitude to the compensated DC input $e_{814}$ and controlled in phase, or synchronous with the reference $e_{ref}$.

I claim:

1. A position control and monitoring circuitry for an electric motor having a plurality of coils and a movable element, comprising:
   drive means generating a square wave drive signal of variable mark/space ratio to drive the coils to position the movable element, the square wave drive signal having a drive signal frequency;
   monitoring means for modulating square wave transitions at a sub-harmonic of the drive signal frequency to generate a monitoring signal for supply to the coils;
   sensing means for sensing the monitoring signal from the coils to thereby determine the position of the movable element; and
   difference means for driving the drive means with a difference between an input signal and an output signal of the sensing means.

2. A circuitry according to claim 1, wherein the monitoring means modulates the square wave transitions at half of the drive signal frequency.

3. A circuitry according to claim 1, wherein the square wave transitions are, in a first sense, modulated by the drive means, and the square wave transitions are, in a second sense opposite to the first sense, modulated by the monitoring means.

4. A circuitry according to claim 2, wherein the square wave transitions are, in a first sense, modulated by the drive means, and the square wave transitions are, in a second sense opposite to the first sense, modulated by the monitoring means.

5. A position control and monitoring method for control and monitoring an electric motor having a plurality of coils and a movable element, comprising the steps of:
   with a drive circuit, generating a square wave drive signal of variable mark/space ratio to drive the coils to position the movable element, the square wave drive signal having a drive signal frequency;
   modulating square wave transitions at a sub-harmonic of the drive signal frequency to generate a monitoring signal for supply to the coils;
   sensing the monitoring signal from the coils to thereby determine the position of the movable element; and
   driving the drive circuit with a difference between an input signal and an output signal of the sensing step.

6. A method according to claim 5, wherein the step of modulating the square wave transitions is performed with a sub-harmonic having half of the drive signal frequency.

7. A method according to claim 5, wherein the step of modulating is performed by modulating the square wave transitions in a first sense by the drive circuit, and by modulating the square wave transitions in a second sense opposite to the first sense by the monitoring signal.

8. A method according to claim 6, wherein the step of modulating is performed by modulating the square wave transitions in a first sense by the drive circuit and by modulating the square wave transitions in a second sense opposite to the first sense by the monitoring signal.

* * * * *